J. W. WYLAND.
GRAIN TRANSFERRING DEVICE.
APPLICATION FILED APR. 1, 1915.
1,269,358.
Patented June 11, 1918.
3 SHEETS—SHEET 1.
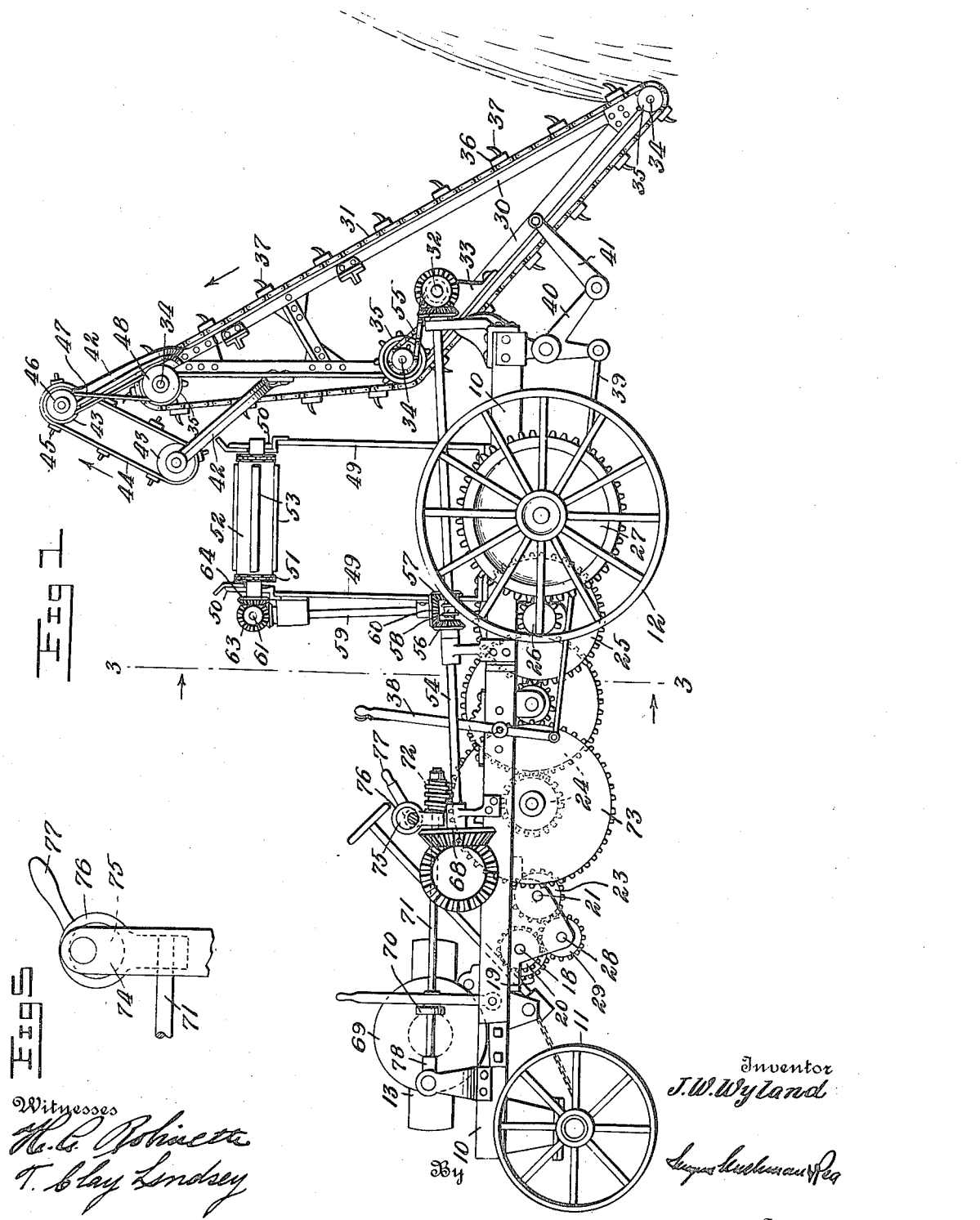
Witnesses
H. C. Robinette
T. Clay Lindsey
Inventor
J. W. Wyland
By
Attorney J. W. WYLAND.
GRAIN TRANSFERRING DEVICE.
APPLICATION FILED APR. 1, 1915.
1,269,358.
Patented June 11, 1918.
3 SHEETS—SHEET 2.
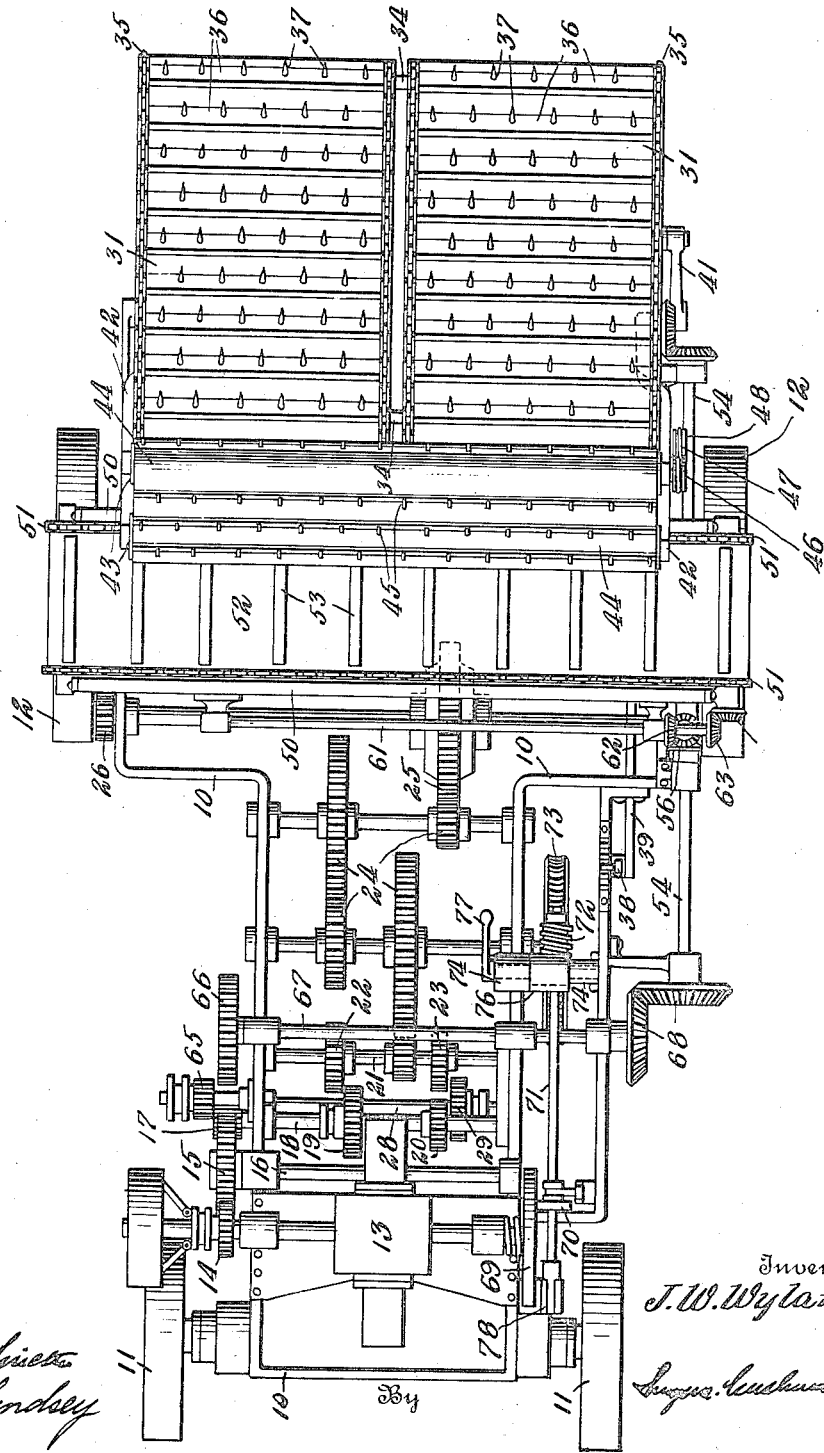

J. W. WYLAND.
GRAIN TRANSFERRING DEVICE.
APPLICATION FILED APR. 1, 1915.
1,269,358.
Patented June 11, 1918.
3 SHEETS—SHEET 3.
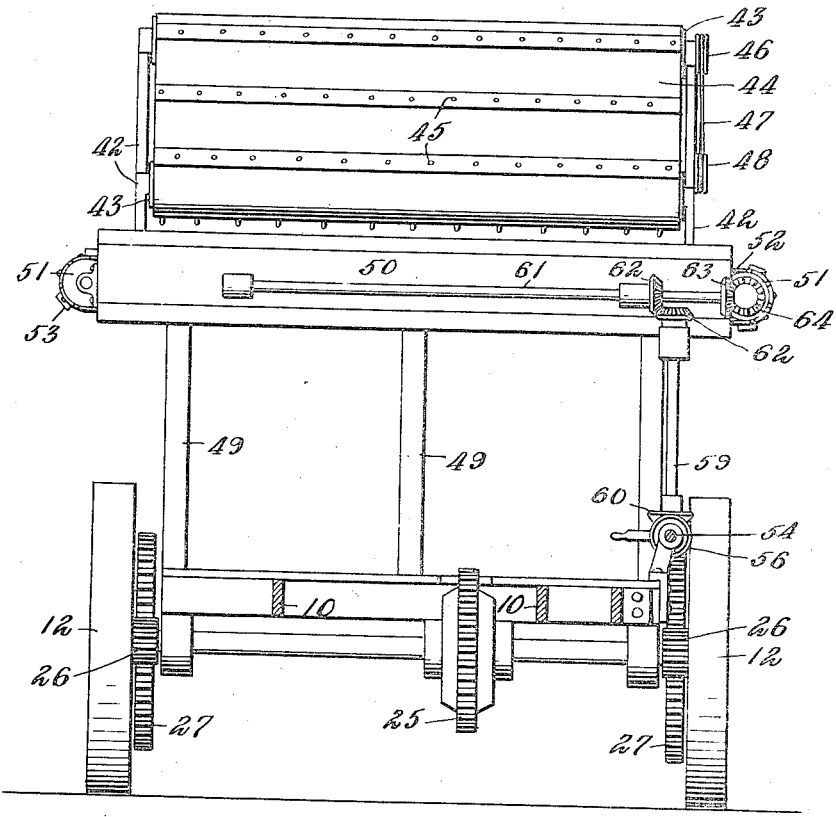
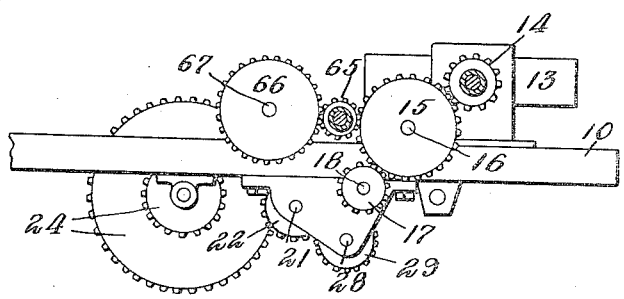
Witnesses
Inventor
J. W. Wyland
By
Attorney

UNITED STATES PATENT OFFICE.

JOHN W. WYLAND, OF HARLAN, KANSAS.

GRAIN-TRANSFERRING DEVICE.

1,269,358.

Specification of Letters Patent.

Patented June 11, 1918.

Application filed April 1, 1915. Serial No. 18,524.

*To all whom it may concern:*

Be it known that I, JOHN W. WYLAND, a citizen of the United States, residing at Harlan, in the county of Smith and State of Kansas, have invented new and useful Improvements in Grain-Transferring Devices, of which the following is a specification.

This invention relates to agricultural implements designed particularly for conveying grain and the like, and has as an object to provide a device having means for tearing and picking up the grain directly from the stack, and feeding the same to a thresher feeder or other desired machine, the entire transfer of the grain from the stack to the thresher feeder or other machine being accomplished solely by mechanical means, the use of hand implements such as forks or the like being entirely eliminated.

It is a further object of this invention to provide a device with means whereby the device may be gradually and continually moved toward and against the stack during the operation of the transferring means, so that the latter is retained in constant contact with the grain and as successive portions of the grain are removed from the stack, the transferring means is presented against new portions of the same.

Another object of the invention is to provide a device with a series of conveyers for transferring the grain and with improved means whereby the grain carried by one of the conveyers is adapted to be easily discharged from the same onto a second conveyer.

The machine embodied in this invention is a separate and distinct device, and is not connected to a thresher or other vehicle. I preferably carry out the invention in a general way by providing a carriage with a plurality of conveyers one of which is adapted to tear and pick up the grain directly from the stack, and to discharge onto a second conveyer, from which the grain may be deposited on either side of the machine as may be desired, and with driving means for gradually moving the device to force the first conveyer against the stack, the conveyers and driving means all being driven from a single motor mounted on the carriage.

The above and other objects of this invention will be more fully brought out in the following detail disclosure of one embodiment of this invention, the same being illustrated in the accompanying drawings, in which,—

Figure 1 is a side elevation of the entire machine showing the same operating against a stack of grain.

Fig. 2 is a top plan view of the same.

Fig. 3 is a transverse cross-section on line 3—3, Fig. 1, looking in the direction of the arrows, parts of the machine being broken away.

Fig. 4 is an enlarged detail view showing in elevation the right-hand side of the forward part of the carriage disclosed in Fig. 2, parts of the transverse mechanism being broken away.

Fig. 5 is an enlarged detail view of the eccentric mechanism for effecting the gradual backward feeding of the device.

In the drawings, wherein like numerals represent like parts, 10 designates a carriage which may be of any convenient form, but is herein shown as comprising two side sills each being outwardly offset intermediate its ends whereby the rear of the carriage is wider than the forward part. The carriage is mounted upon front wheels 11 and upon rear traction wheels 12.

The device is provided with any suitable source of power, in the present instance, an engine 13 being provided which is suitably mounted upon the forward end of the carriage. Any suitable means may be used for connecting the source of power to the traction wheels, and while in the present case such a connection is made by trains of gears, it is for the purposes of illustration only, and any other desired transmission may be substituted. Upon the engine shaft is a pinion 14 which meshes with a gear 15 fixed on a shaft 16, the shaft 16 being journaled in suitable bearings on the carriage 10. As shown in Fig. 4, the gear 15 meshes with a small pinion 17 fixed upon the end of shaft 18, on which shaft is also mounted a slidable transmission gear 19 and a fixed gear 20, the shaft 18 being journaled in suitable bearings on the carriage 10. A shaft 21 is provided with fixed gears 22 and 23, respectively, the gear 22, when it is desired to drive the machine forwardly, being adapted to engage with the slidable gear 19. The shaft 21 also comprises an element in a train of gears 24 leading to the differential gear 25. The differential is fixed on a differential shaft on the opposite ends of which are the drive pinions 26 meshing with the traction gears 27 secured to the traction wheels 12.

The carriage 10 is provided near its forward end with a transverse shaft 28 having a slidable reversing gear 29 thereon which, when thrown into proper position, will cause the device to move backwardly by meshing with gears 20 and 23.

The mechanism just described is adapted for use when desired to transmit the device from one place to another, as from one grain stack to a second one. When it is desired to cause the machine to proceed forwardly the transmission gear 19 is thrown into mesh with gear 22, and presuming that the engine revolves in clockwise direction, looking at the elevation shown in Fig. 1, the power is transmitted from the engine 13 to the traction wheels 12 in the following manner: from the engine shaft to the shaft 18 through the gears 14, 15 and 17, from shaft 18 to the differential gear 25 through the gears 19 and 22 and the train of gears 24, thus actuating the traction wheels 12 to propel the machine forwardly.

When it is desired to reverse the machine, that is, to proceed backwardly, the transmission gear 19 is thrown out of mesh with the gear 22 and the reversing gear 29 is thrown into mesh with gears 20 and 23 whereby the power is then transmitted from the engine 13 to the shaft 18 through gears 14, 15 and 17, and from shaft 18 to the differential gear 25 and traction wheels 12, through the gears 20, 29 and 23, and through the train of gears 24, the latter operating in a reverse direction.

The elevating means for tearing and picking up the grain directly from the stack is mounted upon the rear end of the carriage and comprises an elevating conveyer having a frame 30, over which endless carriers 31 pass. The frame 30 is composed of two spaced-apart side members in the form of obtuse-angled triangles. Extending upwardly and rearwardly from the rear end of the carriage 10 are brackets having bearings at their outer ends in which is journaled a shaft 32. Hinged upon shaft 32 are arms 33 supporting the conveyer frame 30. Between the side members of the conveyer frame 30 at each of the angles thereof are journaled transverse shafts 34 upon which are fixed, in suitable spaced-apart relation, sprocket wheels 35, supporting the side chains of the endless carriers 31. The endless carriers are provided with the usual transverse slats 36 having outstanding teeth 37 curved in the direction of travel of the carriers to engage in the stack and lift the grain therefrom.

The elevating conveyer is adapted to be inclined at various angles to acommodate the same to varying conditions of the stack. The tilting means for accomplishing this result comprises the usual adjustable hand-lever 38 pivotally connected near its lower end, by means of a rod 39 to an arm of the bell-crank 40, the other arm of the bell-crank being connected by means of a link 41 to the frame 30 of the elevating conveyer.

Secured to the conveyer at the upper or discharge end of the same, is a kicker mechanism adapted to aid in the discharge of the grain from the above-described endless carrier 31 to the transverse conveyer hereinafter described. The frame 30 carries pairs of upwardly extending brackets 42 between the ends of which are journaled rollers 43, over which passes an endless belt 44 having transverse rows of spikes or teeth 45. One of the rollers 43 has a pulley 46 on its outer end connected by a drive belt 47 to the elevating conveyer through a pulley 48. The belt 47 is crossed, and the pulley 48 is made larger than the pulley 46 to drive the kicker mechanism at a greater speed than the endless carriers 31 and in a reverse direction thereto whereby the teeth 45 upon the kicker knock and carry the grain from the teeth 37 of the endless carriers 31.

Mounted upon the carriage 10 of the machine, just forwardly of the elevating conveyer and beneath the kicking means, is a transverse conveyer adapted to discharge the grain from either side of the machine, as desired. The transverse conveyer is mounted above the carriage 10 upon uprights or standards 49 rising from the sills of the carriage. Secured across the tops of the uprights 49 are spaced-apart side members 50 extending transversely of the machine, which serve to keep the grain in the trough formed thereby. Journaled between the opposite adjacent ends of the side members 50 are sprockets 51 supporting an endless belt 52 provided with the transverse slats 53 to prevent the grain from slipping upon the belt or apron 52.

The conveyers and the kicking mechanism are adapted to be operated simultaneously, and are driven by means of the engine 31. Journaled in suitable bearings on the carriage 10 is a longitudinal shaft 54 suitably geared, as shown, at its rear end to the shaft 32. The shaft 32 is connected by a crossed chain 55 to the adjacent transverse conveyer shaft 34 for driving the elevating conveyer.

Upon the longitudinal main shaft 54, intermediate its ends, are two oppositely disposed bevel gears 56 and 57 which are provided with a clutch 58 therebetween, whereby one of said bevel gears may run idle while the other rotates with the shaft 54. A vertical shaft 59 is suitably journaled upon the adjacent upright or standard 49, and is provided at its lower end with a bevel gear 60 meshing with gears 56 and 57. The shaft 59 is connected to a transverse shaft 61 by gearing 62. The shaft 61 is carried by the transverse conveyer and is provided with a bevel gear 63 meshing with a like gear 64 mounted on the end of the transverse conveyer. When the longitudinal shaft 54 is revolved, the elevating conveyer, the kicker, and the transverse conveyer are all operated simultaneously through the transmissions above-described.

When it is desired to discharge the grain to one side of the machine, one of the gears 56 or 57, by means of the clutch 58, is locked to the shaft 54, so that the belt 52 operates in the desired direction. When it is desired to operate the belt 52 in the opposite direction, the clutch 58 is shifted to lock the opposite gear 56 or 57, to reverse the direction of the belt 52 while the released gear 56 or 57 runs free.

The shaft 54 is driven by the engine 13 through the following train of gears: A small transmission pinion 65 is slidably mounted upon a suitable stub-shaft on the carriage 10, and is adapted to mesh with the gears 15 and 66. The gear 66 is fixed upon a transverse shaft 67 which shaft is connected to the longitudinal shaft 54 by suitable gearing 68.

As before stated, it is one of the objects of this invention to provide the machine with means for driving the same to keep the elevating conveyer in constant contact with the stack while the conveyer is operating. It is desirable that this means be such as to yieldingly drive the machine so as to maintain the elevating conveyer against the stack with sufficient pressure to insure the operation of the machine and at the same time to prevent excessive pressure between the stack and the machine. I preferably employ the following driving mechanism to accomplish this result: This mechanism, in the present instance, comprises a friction disk 69 fixed upon the end of shaft of the engine 13 and against the face of which bears a friction wheel 70. The friction wheel 70 is slidably mounted upon a longitudinal shaft 71, to admit the changing of the speed of the shaft 71. The shaft 71 is provided with a worm 72 adapted to mesh with the worm gear 73, the latter being connected to the train of gears 34, as shown in Fig. 2. It is thus seen that the relatively slow rotation of the shaft 71 operates through the reduced worm gearing 72 and 73 to slowly and yieldingly drive the train of gears 24 backward and effect the consequent gradual and yielding rear movement of the entire machine.

The shaft 71 is mounted at its forward end in a pivoted bearing 78 to admit of the swinging of the rear end thereof toward and from the worm gear 73 to throw the worm 72 into and out of mesh with the gear 73. This swinging of the shaft 71 is effected by means of an eccentric 75 mounted for rotation in the bearings 74 on the carriage 10, the eccentric carrying an eccentric strap 76, the lower end of which constitutes the rear bearing for the shaft 71. The eccentric 75 carries a suitable handle 77 for admitting the manual operation thereof to connect and separate the worm driving mechanism.

It is obvious that the structure herein shown and described is susceptible of various modifications and changes in form, proportion and arrangement of parts within the scope of the claims and without departing from the principle of the invention.

What I claim as new is:—

1. In a grain transferring device, a carriage, an elevating conveyer upon the carriage adapted to tear and pick up grain directly from the stack, a second conveyer upon which said first conveyer discharges, and a kicker mechanism between said conveyers comprising a toothed traveling belt intersecting and reversely inclined to the plane of the conveying side of said first conveyer and traveling faster than the conveyer so as to kick the grain from the first conveyer to the second conveyer.

2. In a grain transferring device, a carriage, an inclined elevating conveyer upon the carriage adapted to tear and pick up grain directly from the stack, means for swinging said conveyer up and above a second conveyer on to which said first conveyer discharges, a kicker mechanism carried by the upper end of said first conveyer reversely inclined thereto and comprising a toothed belt traveling between the two conveyers and moving over the edge of the first conveyer for aiding the discharge of the grain from the first to the second conveyer, and a drive mechanism between the kicker mechanism and said first conveyer, whereby the traveling belt of said kicker mechanism travels at a greater speed than said elevating conveyer.

In testimony whereof I have hereunto set my hand in presence of two subscribing witnesses.

JOHN W. WYLAND.

Witnesses:
F. S. MUNSINGER,
MILES ELSON.